United States Patent
Sookprasong

(10) Patent No.: US 12,468,727 B2
(45) Date of Patent: Nov. 11, 2025

(54) SYNCHRONISING DATASETS UPDATES

(71) Applicant: PALANTIR TECHNOLOGIES INC., Denver, CO (US)

(72) Inventor: Jamie Sookprasong, Seattle, WA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/944,953

(22) Filed: Nov. 12, 2024

(65) Prior Publication Data

US 2025/0068647 A1   Feb. 27, 2025

Related U.S. Application Data

(63) Continuation of application No. 17/843,435, filed on Jun. 17, 2022, now Pat. No. 12,141,163.

(51) Int. Cl.
*G06F 16/27* (2019.01)
*G06F 16/23* (2019.01)

(52) U.S. Cl.
CPC .......... *G06F 16/27* (2019.01); *G06F 16/2379* (2019.01)

(58) Field of Classification Search
CPC ........ G06F 16/27; G06F 16/2379; G06F 8/65; G06F 8/71; G06F 16/219; G06F 16/256; G06F 16/236
See application file for complete search history.

(56) References Cited

U.S. PATENT DOCUMENTS

| | | |
|---|---|---|
| 11,886,439 B1 | 1/2024 | Hwang et al. |
| 2017/0228405 A1 | 8/2017 | Ward et al. |
| 2017/0357648 A1 | 12/2017 | Fink et al. |
| 2018/0240290 A1 | 8/2018 | Kumar et al. |
| 2019/0114335 A1 | 4/2019 | Koenig et al. |
| 2019/0147114 A1 | 5/2019 | MacLean et al. |

(Continued)

OTHER PUBLICATIONS

Extended European Search Report mailed Jan. 10, 2023, issued in related European Patent Application No. 22182985.6 (13 pages).

(Continued)

*Primary Examiner* — Albert M Phillips, III
(74) *Attorney, Agent, or Firm* — Sheppard Mullin Richter & Hampton LLP

(57) ABSTRACT

An apparatus, computer-implemented method and computer program are disclosed for synchronising dataset updates. For example, the method may comprise providing a first code branch associated with a plurality of code sets which, when executed, produce respective time-series datasets for provision to a downstream process linked to the first code branch. The method may also comprise generating a second code branch, based on the first code branch, the second code branch executing the plurality of code sets as part of an updating process and, if successful, storing respective time-series datasets to respective memory locations associated with the second code branch. Another part of the method may comprise determining if all code sets executed by the second code branch have successfully committed. Responsive to a positive determination, one or more pointers, e.g. all pointers, associated with the first code branch may be updated to point to the respective memory locations associated with the second code branch in order that the respective successfully-committed time-series datasets are provided to the downstream process.

20 Claims, 6 Drawing Sheets

(56) References Cited

U.S. PATENT DOCUMENTS

2019/0302981 A1 10/2019 Storr et al.
2021/0064475 A1 3/2021 Baker

OTHER PUBLICATIONS

Dongyao Wu et al., "Building Pipelines for Heterogeneous Execution Environments for Big Data Processing", IEEE Software, IEEE, vol. 33, No. 1, Mar. 1, 2016, pp. 60-67.
Erik Johannes Husom, "UDAVA An Unsupervised Learning Pipeline for Sensor Data Validation in Manufacturing", Proceedings of the 9th IEEE/ACM International Conference on Mobile Software Engineering and Systems, ACMPUB27, New York, NY, May 16, 2022, pp. 159-169.
Robert Fink, "On Dataset Versioning in Palantir Foundry", Palantir Blog, Nov. 14, 2019, pp. 1-6.
Non-Final Office Action dated Mar. 6, 2024, issued in related U.S. Appl. No. 17/843,435 (37 pages).

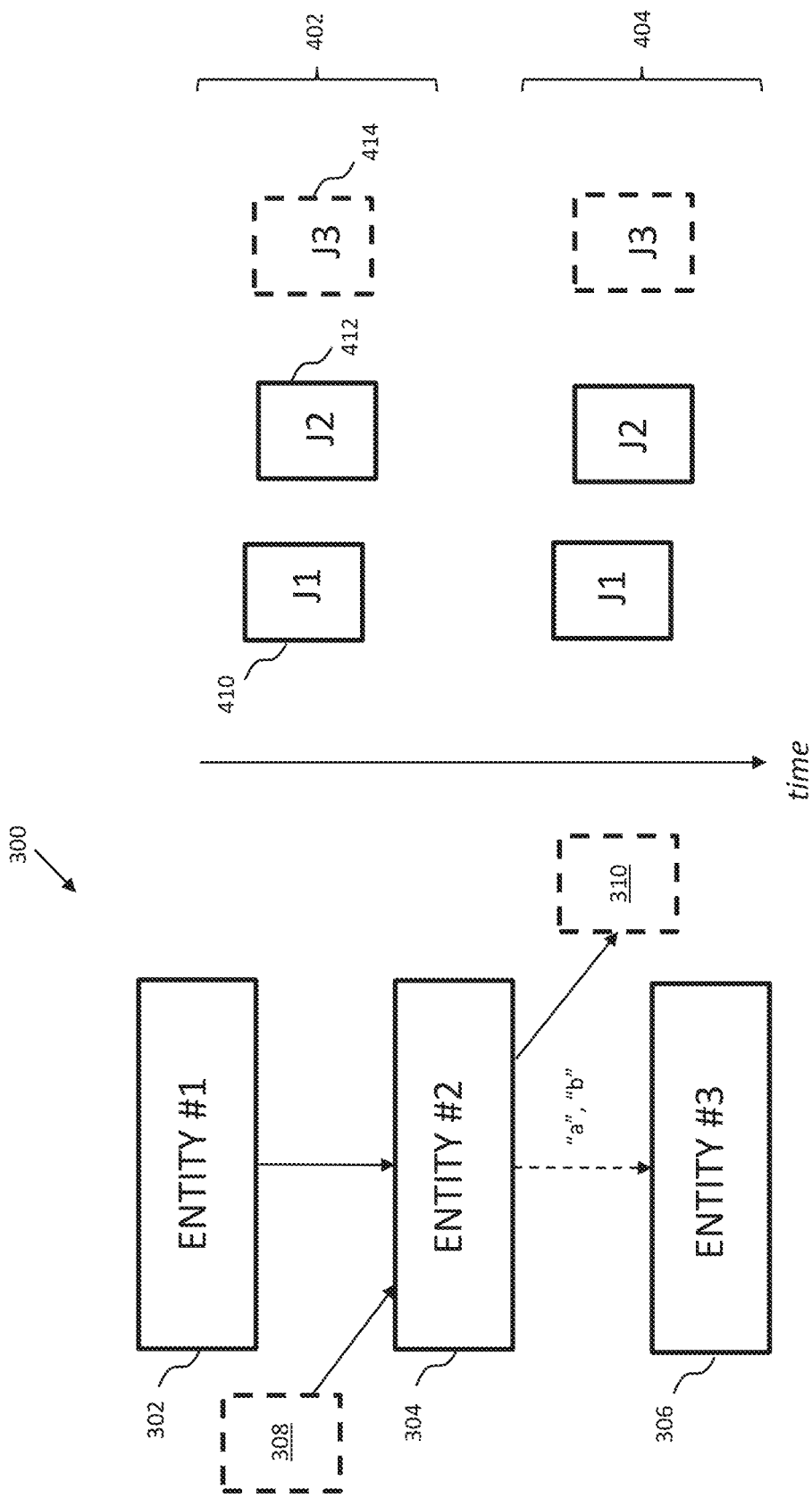

SYNCHRONISING DATASETS UPDATES

CROSS REFERENCE TO RELATED APPLICATIONS

This application is a continuation of U.S. application Ser. No. 17/843,435, filed Jun. 17, 2022, the content of which is incorporated by reference in its entirety into the present disclosure.

FIELD OF THE DISCLOSURE

The present disclosure relates to methods, systems and computer programs for synchronising dataset updates, for example in relation to datasets representing time-sensitive data.

BACKGROUND

Cloud computing is a computing infrastructure for enabling ubiquitous access to shared pools of servers, storage, computer networks, applications and other data resources, which can be rapidly provisioned, often over a network, such as the Internet.

For example, a "data resource" as used herein may include any item of data or code set that can be used by one or more computer programs. In example embodiments, data resources may be stored in one or more network databases and are capable of being accessed by applications hosted by servers that share common access to the network database. A data resource may, for example, be a data analysis application, a data transformation application, a report generating application, a machine learning process, a file storing one or more code sets, a file storing one or more datasets that may be generated by execution of the one or more code sets, a spreadsheet, a database, or part of a spreadsheet or part of a database, e.g. records or data objects.

Some companies provide cloud computing services for registered organizations, for example, organizations such as service providers, to create, store, manage and execute their own resources via a network. Users within the organization's domain, and other users outside of the customer's domain, e.g., support administrators of the provider company, may perform one or more actions on one or more data resources, which actions may vary from reading, authoring, editing, transforming, updating, merging, or executing. Sometimes, these resources may interact with other resources, for example, those provided by the cloud platform provider. Certain data resources may be used to control external systems.

Some organizations may operate such that one part of the organization, by execution of one or more code sets, populates time-sensitive data, e.g. time-series data, as one or more datasets for use by a downstream part of the organization, or possibly by another organization, for further processing. It is usually important, and in certain circumstances essential, that the time-sensitive datasets relating to a downstream task are up-to-date, and updated in unison, particularly if the downstream task is for performing mission-critical tasks such as those relating to, for example, component failure, computer security and so on.

SUMMARY

According to an aspect, there may be provided a method, performed by one or more processors, comprising:

providing a first code branch associated with a plurality of code sets which, when executed, produce respective time-series datasets for provision to a downstream process linked to the first code branch;

generating a second code branch, based on the first code branch, the second code branch executing the plurality of code sets as part of an updating process and, if successfully committed, storing respective time-series datasets to respective memory locations associated with the second code branch;

determining if all code sets executed by the second code branch have successfully committed:

responsive to a positive determination, updating one or more pointers associated with the first code branch to point to the respective memory locations associated with the second code branch in order that the respective successfully-committed time-series datasets are provided to the downstream process.

The method may further comprise: responsive to a negative determination, deleting the second code branch.

The method may further comprise: detecting an updating event associated with the first code branch; and generating the second code branch and executing the plurality of code sets responsive to detection of the updating event.

The updating event may be automatically initiated at periodic intervals and/or responsive to a signal received from a source of data that one or more of the plurality of code sets is or are configured to receive.

Generating the second code branch may comprise replicating the plurality of code sets associated with the first code branch and executing the replicated plurality of code sets as part of the updating process independently of the plurality of code sets associated with the first code branch.

The first code branch may be associated with respective memory locations which, by means of the updated one or more pointers, point to the respective memory locations associated with the second code branch.

The downstream process may be linked to the first code branch by means of pointers to respective memory locations associated with the first code branch.

The first code branch may have an associated first head reference which points to respective memory locations of the most up-to-date versions of time-series datasets associated with the first code branch and the second code branch may have an associated second head reference which points to respective memory locations of the most up-to-date versions of time-series datasets associated with the second code branch, wherein updating the one or more pointers associated with the first code branch may comprise updating the first head reference so that it points to the same memory location as the second head reference.

The plurality of code sets may comprise code which, when executed, receives or causes receipt of, in one time-series dataset, data representing component failure reports and, in another time-series dataset, data representing at least a set of entities and constituent components of the entities. The downstream process may be configured to identify entities having constituent components that require updating or servicing based on the component failure reports.

According to one or more other aspects, there may be provided a computer program, optionally stored on a non-transitory computer readable medium which, when executed by one or more processors of a data processing apparatus, causes the data processing apparatus to carry out the computer-implemented method according to any preceding definition.

According to one or more other aspects, there may be provided an apparatus configured to carry out the computer-implemented method according to any preceding definition, the apparatus comprising one or more processors or special-purpose computing hardware.

BRIEF DESCRIPTION OF THE DRAWINGS

Example embodiments will now be described by way of non-limiting example with reference to the accompanying drawings, in which:

FIG. 3 is a block diagram of part of an organisation comprising a plurality of entities, at least one of which is configured according to embodiments of this specification;

FIG. 4 is a block diagram showing two instances of a build being executed, a build comprising a plurality of task;

DETAILED DESCRIPTION OF CERTAIN EMBODIMENTS

Figure 1:
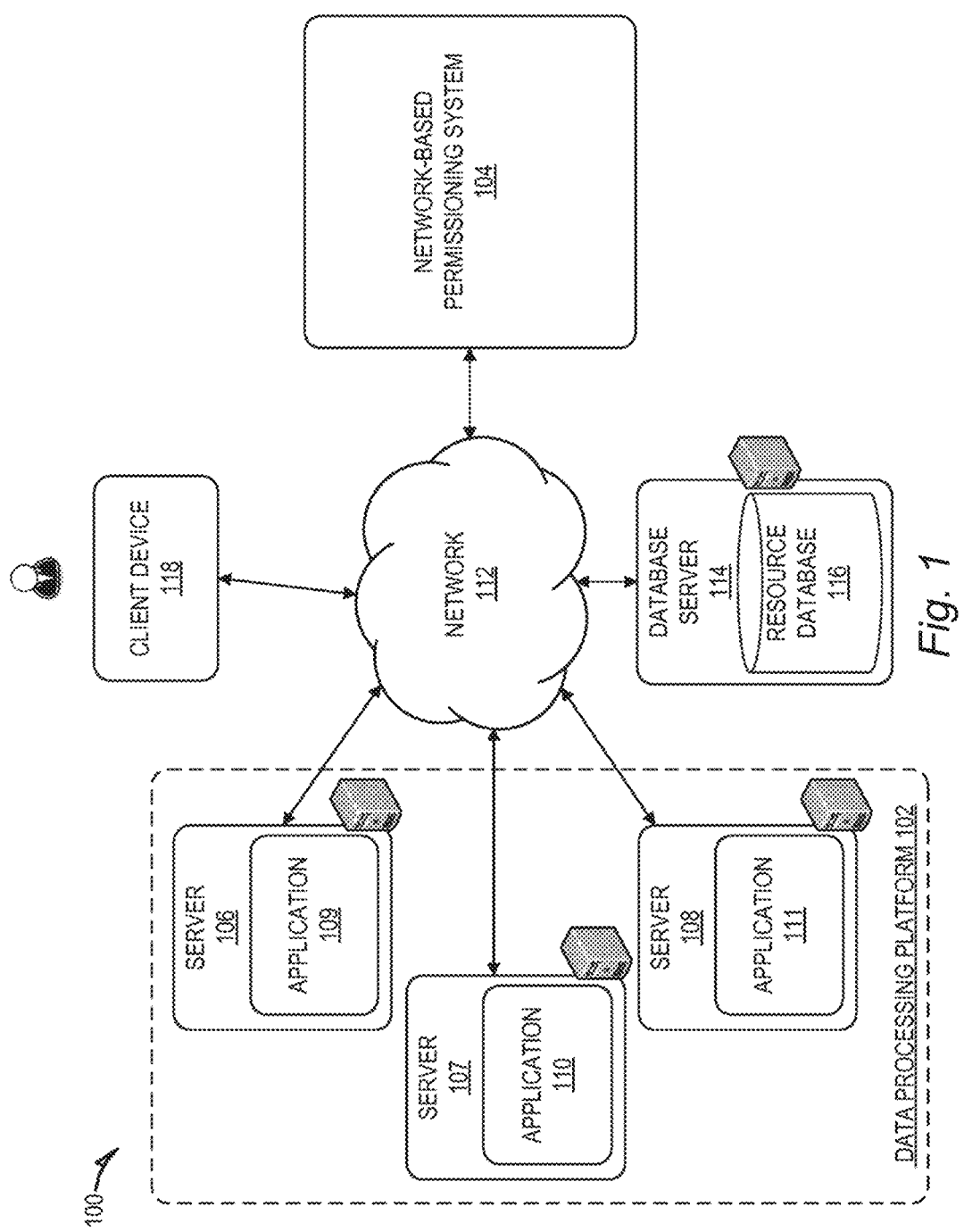
FIG. 1 is a block diagram illustrating a network system comprising a group of application servers of a data processing platform according to some embodiments of this specification.

Example embodiments relate to methods, systems and computer programs for synchronising dataset updates, for example in relation to datasets representing time-sensitive data stored in a database or some other form of storage media.

Some organizations, such as scientific, engineering, informational technology, logistical and/or sales organisations may operate such that one part of the organization, by execution of one or more code sets, generates time-sensitive data as one or more datasets for use by a downstream part of the organization, or possibly by another organization. The code sets may simply be configured, when executed, to pull or request respective data sets from part of the organisation's database, from one or more individual computer systems and/or directly from one or more sensors, such as sensors which capture representations or measurements of real-world properties such as temperature, pressure, flow rate, health parameters etc. The code sets may additionally, but not essentially, perform one or more processing tasks on the pulled or received data, such as data cleaning or one or more transformations to conform the datasets to an ontology.

In certain circumstances, it is essential that different sets of the generated time-sensitive data are all up-to-date in unison, particularly if a downstream part of the organization is reliant on the latest available data for these datasets for performing mission-critical tasks such as those relating to, for example, component failure, computer security, alert generation and so on. Ensuring that data sets of this nature is up-to-date can be laborious and, even if automated, a processing intensive task which might require numerous data messages and checks between different entities.

Example embodiments relate to alleviating or overcoming such issues in an automated way by ensuring that dataset refreshes, or updates, are provided to one or more downstream processes, e.g. of a processing pipeline, in an atomic way. By "atomic" it is meant that datasets provided by a first entity to a second, downstream entity for performing a particular downstream process are only provided or made available to that downstream entity if the most-recent update on those datasets succeed in terms of their execution. It is an "all or nothing" approach.

Example embodiments may make use of a platform that provides version control functionality for software builds by means of branches. A branch may refer to a particular version of dataset produced by execution of a code set. For example, a primary branch may have associated code sets which, if executed, produce a first set of data. A secondary branch, if created, may enable producing a second set of data from execution of the same, or modified code sets (different versions of the code sets). Platforms of this nature are useful for testing, by means of the secondary branch, code updates without affecting code sets or the resulting datasets of the primary branch.

For example, a first code set, when executed, may request from one or more first computers or computer processes, a first dataset relating to current component failure reports for machinery or some form of craft, e.g. aircraft. The received first dataset may be raw data obtained directly from a source of the data or it may be processed in some way prior to storage, e.g. to clean the data and/or to conform to an ontology. The first dataset may be stored as one or more tables at particular memory location(s). A second code set, when executed, may request from one or more second computers a second dataset relating to current operational machinery or craft of the organisation and their respective constituent components. Similarly, the second dataset may be stored at a second particular memory location, with or without performance of other processing steps as part of the code execution. A downstream part of the organization may need to have access to the most up-to-date versions of the first and second code sets in order to determine which machinery or craft to service based on the component failure reports. If any one of the datasets are out-of-date, e.g. the first dataset reflects old data that has since been updated at its source, incorrect results may occur, possibly resulting (in this case) in one or more potential machines or craft failures not being identified.

Particular embodiments will now be described with reference to the Figures.

FIG. 1 is a network diagram depicting a network system 100 comprising a data processing platform 102 in communication with a network-based permissioning system 104 (hereafter "permissioning system") configured for registering and evaluating access permissions for data resources to which a group of application servers 106-108 share common access, according to an example embodiment. Consistent with some embodiments, the network system 100 may employ a client-server architecture, though the present subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

The data processing platform 102 includes a group of application servers, specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyse data to develop various insights about the data, and visualize various metrics associated with the data. To further this example, the network application 109 may be used to analyse data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers and in other embodiments, fewer or additional servers and applications may be included.

The applications 109-111 may be associated with a first organisation. One or more other applications (not shown) may be associated with a second, different organisation or a different part or entity of the first organisation. These other applications may be provided on one or more of the application servers 106, 107, 108 which need not be specific to a particular organisation. Where two or more applications are provided on a common server 106-108 (or host), they may be containerised which as mentioned above enables them to share common functions.

Each of the servers 106-108 may be in communication with the network-based permissioning system 104 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a separate database server 114. The resource database 116 may store other data resources that may be used by any one of the applications 109-111 hosted by the data processing platform 102.

In other embodiments, one or more of the database server 114 and the network-based permissioning system 104 may be local to the data processing platform 102; that is, they may be stored in the same location or even on the same server or host as the network applications 109, 110, 111.

As shown, the network system 100 also includes a client device 118 in communication with the data processing platform 102 and the network-based permissioning system 104 over the network 112. The client device 118 communicates and exchanges data with the data processing platform 102.

The client device 118 may be any of a variety of types of devices that include at least a display, a processor, and communication capabilities that provide access to the network 112 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

Figure 2:
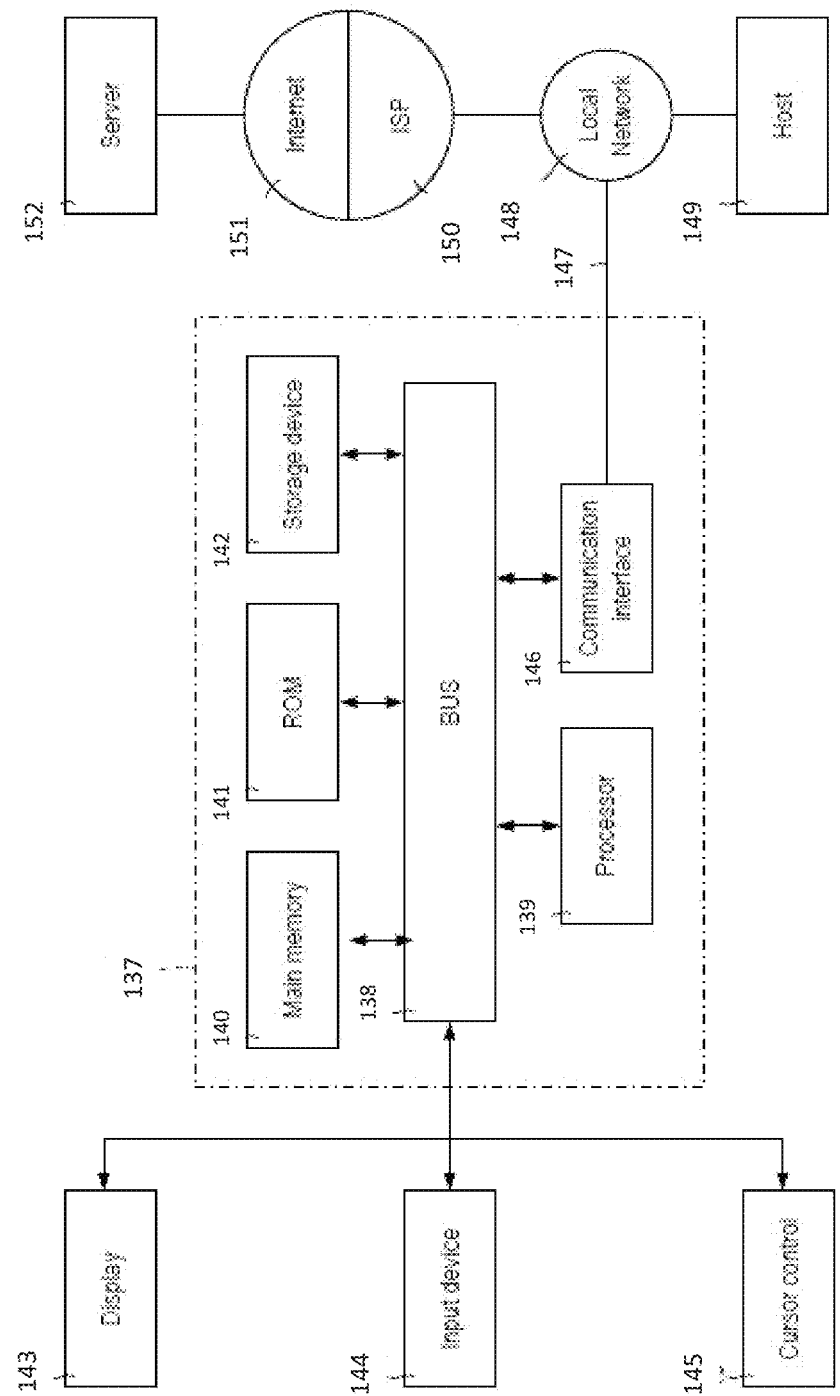
FIG. 2 is a block diagram of a computer system according to embodiments of this specification.

Referring to FIG. 2, a block diagram of an exemplary computer system 137, which may comprise the data processing platform 102, one or more of the servers 106-108, the database server 114 and/or the network-based permissioning system 104, consistent with examples of the present specification is shown.

Computer system 137 includes a bus 138 or other communication mechanism for communicating information, and a hardware processor 139 coupled with bus 138 for processing information. Hardware processor 139 can be, for example, a general purpose microprocessor. Hardware processor 139 comprises electrical circuitry.

Computer system 137 includes a main memory 140, such as a random access memory (RAM) or other dynamic storage device, which is coupled to the bus 138 for storing information and instructions to be executed by processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

Computer system 137 further includes a read only memory (ROM) 141 or other static storage device coupled to the bus 138 for storing static information and instructions for the processor1 139. A storage device 142, such as a magnetic disk or optical disk, is provided and coupled to the bus 138 for storing information and instructions.

Computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is cursor control 145, for example using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

Computer system 137 can implement the techniques described herein using customized hard-wired logic, one or more ASICs or FPGAs, firmware and/or program logic which in combination with the computer system causes or programs computer system 137 to be a special-purpose machine. According to some embodiments, the operations, functionalities, and techniques disclosed herein are performed by computer system 137 in response to the processor 139 executing one or more sequences of one or more instructions contained in the main memory 140. Such instructions can be read into the main memory 140 from another storage medium, such as storage device 142. Execution of the sequences of instructions contained in main memory 140 causes the processor 139 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 142. Volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus 138. Transmission media can also take the form of acoustic or light waves, such as those generated during radio-wave and infra-red data communications.

Various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 137 can receive the data on the telephone line or other transmission medium and use an infra-red transmitter to convert the data to an infra-red signal. An infra-red detector can receive the data carried in the infra-red signal and appropriate circuitry can place the data on bus 138. Bus 138 carries the data to the main memory 140, from which the processor 139 retrieves and executes the instructions. The instructions received by the main memory 140 can optionally be stored on the storage device 142 either before or after execution by the processor 139.

Computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

The network link 147 typically provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network now commonly referred to as the "Internet" 151. The local network 148 and internet 151 both use electrical, electromagnetic or optical signals that carry digital data streams. The signals through the various networks and the signals on the network link 147 and through the communication interface 146, which carry the digital data to and from the computer system 137, are example forms of transmission media.

The computer system 137 can send messages and receive data, including program code, through the network(s), network link 147 and communication interface 146. For example, a first application server 106 may transmit data through the local network 148 to a different application server 107, 108.

One of said applications 109, 110, 111 or another application may provide an application according to example embodiments. The application may be a stand-alone or web-based platform, the latter being accessible to multiple users at respective different locations.

FIG. 3 is a block diagram representing an organisation 300 or part thereof. The organisation may be any type of organisation, for example such as a scientific, engineering, informational technology, logistical and/or sales organisation. The organisation 300 may comprise a plurality of entities 302, 304, 306, 308, 310 which may perform different roles or functions within the organisation and, as such, may generate, provide and/or receive datasets from other entities. For example, a first entity 302 may generate and provide one or more first datasets to the second entity 304. The one or more first datasets may be stored at, or in association with, the first entity 302 in any suitable form, e.g. as raw data or data within respective tables, e.g. database tables conforming to a particular ontology. For example, the first entity 302 may comprise a set of one or more sensors or databases and the first datasets may comprise raw data. For example, a second entity 304 may continuously, periodically, or at some event time, request the one or more first datasets from the first entity 302. This may be by means of executing one or more code sets which may pull the respective datasets from the first entity 302, or request that the first entity sends the one or more datasets to the second entity 304. For example, a first code set may request dataset "a" and a second code set may request dataset "b". The first and second code sets may be distinct code sets or may comprise distinct sets or portions of code within a single executable file. As mentioned above, the first and second code sets may also perform one or more further post-processing operations on the received datasets, particularly if the received datasets are raw datasets; such processing operations may comprise, for example, data cleaning (e.g. to remove null entries), joins and/or conforming the dataset to a predetermined ontology. In this sense, the term "dataset" may refer to raw data, pre-processed data where the first entity 302 performs further processing operations on the raw data, or post-processed data where the second entity 304 performs further processing operations on the raw or pre-processed data.

The received datasets may be time-sensitive datasets, i.e. they may represent time-sensitive data such as time-series data. This means data that may change over time and is stored with respect to a time or time index at which the data was logged or recorded at the first entity 302. Examples of time-series data include, but are not limited to, scientific, engineering, informational technology, logistical, law enforcement and/or sales data.

In accordance with example embodiments, the second entity 304 may store the datasets in respective memory locations and then perform one or more further processing functions to ensure that downstream processing operations performed by, for example, a third entity 306 is or are based on the most up-to-date versions of the respective datasets. Example embodiments may be concerned with operations performed by the second entity 304 in this example, but equally might be performed by the first entity 302 if able to communicate data to a downstream entity, e.g. the third entity 306, that requires up-to-date data via updates.

The third entity 306 may, for example, be configured to issue alerts in the event of one or more predetermined events and/or perform an operational function such as enabling or disabling some computational, electrical or electronic entity.

For example, datasets "a" and "b" may be respective first and second tables, where "a" represents a listing of current component failure reports, e.g. aircraft components, and "b" represents a listing of all current aircraft of the organisation and their constituent components. The one or more further processing operations performed by the third entity 306 downstream may comprise identifying, by means of the first and second tables, current aircraft comprising components that have failed in other aircraft, for the purpose of one or more of issuing alerts, grounding the aircraft, scheduling repair work and ordering replacement components. As another example, datasets "a" and "b" may be tables, where "a" represents a current inventory of products for sale and "b" represents current open sales orders. The one or more further processing operations performed by the third entity 306 may comprise generating alerts and/or ordering new products when the open sales orders volume exceeds that of the current inventory for a given product. In both examples, it will be appreciated that there is a need for the tables "a" and "b" to comprise the latest data and hence a need for atomic updates as opposed to partial updates which may be problematic.

For completeness, a fourth entity 308 and a fifth entity 310 are depicted in FIG. 3 to represent further sources of data; in this case, input data to the second entity 304 and output data from the second entity. The inter-relation between the various entities 302, 304, 306, 308, 310 may be considered a form of processing pipeline of which the second entity, in example embodiments, will be described in more detail.

FIG. 4 is a representational view of first, second and third code sets 410, 412, 414 shown against a time axis to indicate that the code sets may be executed by, in this case, the second entity 304 in parallel or at slightly different times. Each of the first to third code sets 410, 412, 414 may refer to a "job" which is the task of the respective code set when executed by the second entity 304, e.g. to get or create an updated dataset for the job. The first to third code sets 410, 412, 414 may be collectively referred to as a "build" 402, 404 and each code set is run independently when an updated build is requested; each may either succeed in the sense that, in accordance with the usual parlance of transactional databases, it successfully commits a produced dataset to a respective memory location, or it may fail. In this sense, a failure may occur if there is an error in the respective code set, if the raw data is not available and/or it is not possible to conform received data to a predetermined ontology, to give some examples. It is understood that the entity that executes the first to third code sets 410, 412, 414 will receive a notification of success through a commit or of an error, i.e. a failure or non-commit.

First and second builds 402, 404 are shown in FIG. 4 to indicate requested executions of each of the first to third code sets 410, 412, 414 at distinct and spaced-apart update times to generate up-to-date datasets for the respective jobs within the builds. The timing of the builds 402, 404 may be at predetermined times, e.g. every hour, every day and/or in response to a request or trigger from another entity, e.g. from the first entity 302 due to it receiving new data or new data above a predetermined threshold and/or from the third entity 306 at a time it intends performing its one or more further processing operations.

In accordance with example embodiments, all jobs 410, 412, 414 of a particular build 402, 404 must succeed in order to guarantee that the datasets provided to, in this case, the third entity 306, are up-to-date and current. The data within a given dataset may not change if the raw data from which the dataset derives does not change, but it is still up-to-date in this case due to the atomic nature of the update, and example embodiments ensure that the downstream entity is guaranteed of current information without the need for further investigation and checking (which might be the case if no change is noticed.)

Figure 5:
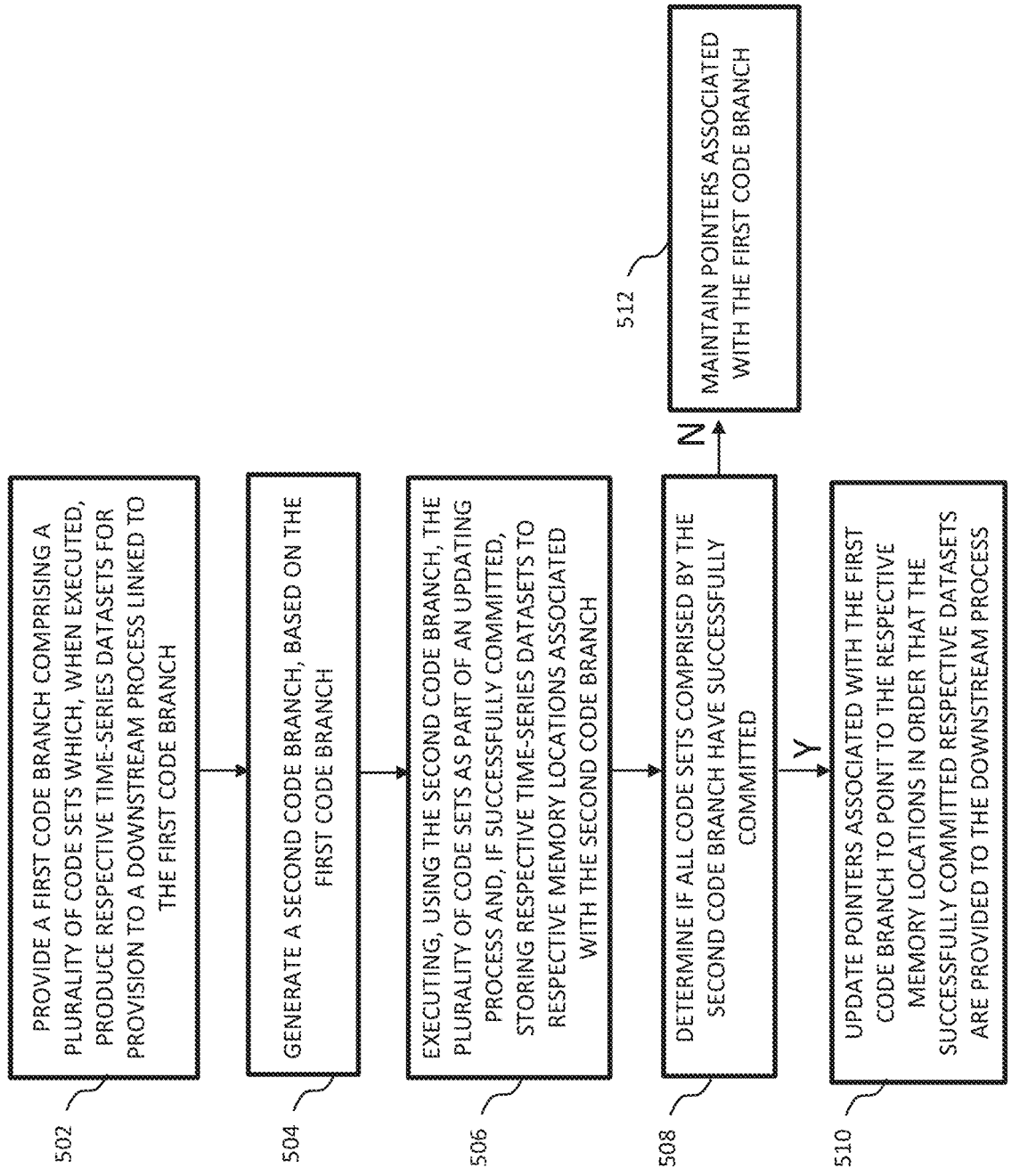
FIG. 5 is a flow diagram indicating operations according to one or more example embodiments.

FIG. 5 is a flow diagram indicating operations performed by one or more processors of an appropriate computing system, for example using the system shown in FIG. 2, and may describe operations performed by the second entity 304 shown and described with respect to FIG. 3, or another entity that is tasked with providing atomic updates to a downstream entity. The operations may be performed by software, firmware, hardware or a combination thereof.

A first operation 502 may comprise providing a first code branch associated with a plurality of code sets which, when executed, produce respective time-series datasets for provision to a downstream process linked to the first code branch.

A second operation 504 may comprise generating a second code branch, based on the first code branch.

A third operation 506 may comprise executing, using the second code branch, the plurality of code sets as part of an updating process and, if successfully committed, i.e. executed, storing respective time-series datasets to respective memory locations associated with the second code branch;

A fourth operation 508 may comprise determining if all code sets executed by the second code branch have successfully committed, i.e. executed.

A fifth operation 510 may comprise, responsive to a positive determination, updating one or more pointers, e.g. all pointers, associated with the first code branch to point to the respective memory locations associated with the second code branch in order that respective time-series datasets are provided to the downstream process.

A sixth operation 512 may comprise, responsive to a negative determination, maintaining one or more pointers, e.g. all pointers, associated with the first code branch.

It will be appreciated that certain operations may be omitted or reordered in some embodiments.

Regarding the first and second operations 502, 504, branches may refer to different versions of code or code sets and/or of respective datasets. For example, it will be appreciated that certain platforms, such as but not limited to GitHub or similar, enable users to create code repositories and, within a given repository, to run one or more code sets for producing datasets in the manner described above. A branch, if generated, enables another version of the one or more code sets effectively to be run independently of the original first, primary or main branch; conventionally, this is to allow modifications to the one or more code sets in the main branch to be tested in one or more other branches without affecting code sets (and the generated datasets) in the primary branch which may be operational. For each branch, a "head reference" keeps track of the most recent "commit". A commit refers to a successfully-executed transaction (e.g. a write of output data) and hence the head reference points to the most recent successfully-executed transaction or set of transactions. Sometimes, branches are generated from the point of a given commit.

Example embodiments may make use of such a versioning platform to ensure updates are atomic in the context outlined above.

Regarding the first operation 502, a downstream process may be linked to the first code branch by means of it pointing to, or receiving data from, respective memory locations associated with datasets produced by the first code branch. For example, the downstream process may point to a first head reference associated with the first code branch and that first head reference may point to memory locations associated with a second head reference associated with the second code branch which, as will be appreciated, points to the respective memory locations of the most-recent datasets. By only updating the first head reference if all code sets execute successfully in the second code branch, atomic updates result. By this, there is computational efficiency because only one processing operation is made to change the first head reference and only if all codes successfully execute and commit their respective datasets.

In some example embodiments, a change to the first head reference may signal to the downstream process that an update is available.

In some example embodiments, responsive to a negative determination in the fourth operation 508, the second code branch may be deleted, saving physical storage space. A new second code branch may be generated later-on at a subsequent update time.

In some example embodiments, further operations may comprise detecting an updating event associated with the first code branch, and responsive thereto, generating the second code branch and executing the plurality of code sets.

The updating event may be automatically initiated at periodic intervals or may be continuous.

In some example embodiments, generating the second code branch may comprise replicating the plurality of code sets associated with the first code branch and executing the replicated plurality of code sets as part of the updating process independently of the plurality of code sets associated with the first code branch.

In some example embodiments, the first code branch may be associated with respective memory locations which, by means of the updated one or more pointers, point to the respective memory locations associated with the second code branch. The downstream process may be linked to the first code branch by means of pointers to respective memory locations associated with the first code branch.

In some example embodiments, the first code branch may have an associated first head reference which points to respective memory location(s) of the most up-to-date versions of time-series datasets associated with the first code branch and the second code branch may have an associated second head reference which points to respective memory locations of the most up-to-date versions of time-series datasets associated with the second code branch, wherein updating the one or more pointers associated with the first code branch comprises updating the first head reference so that it points to the same memory location(s) as the second head reference.

In some example embodiments, the plurality of code sets may comprise code which, when executed, receives or causes receipt of, in one time-series dataset, data representing component failure reports and, in another time-series dataset, data representing at least a set of entities and constituent components of the entities, the downstream process being configured to identify entities having constituent components that require updating or servicing based on the component failure reports.

In some example embodiments, the aforementioned operations may be performed by executing, using one or more processors of a data processing apparatus, a computer program which may optionally be stored on a non-transitory computer readable medium.

Figure 6:
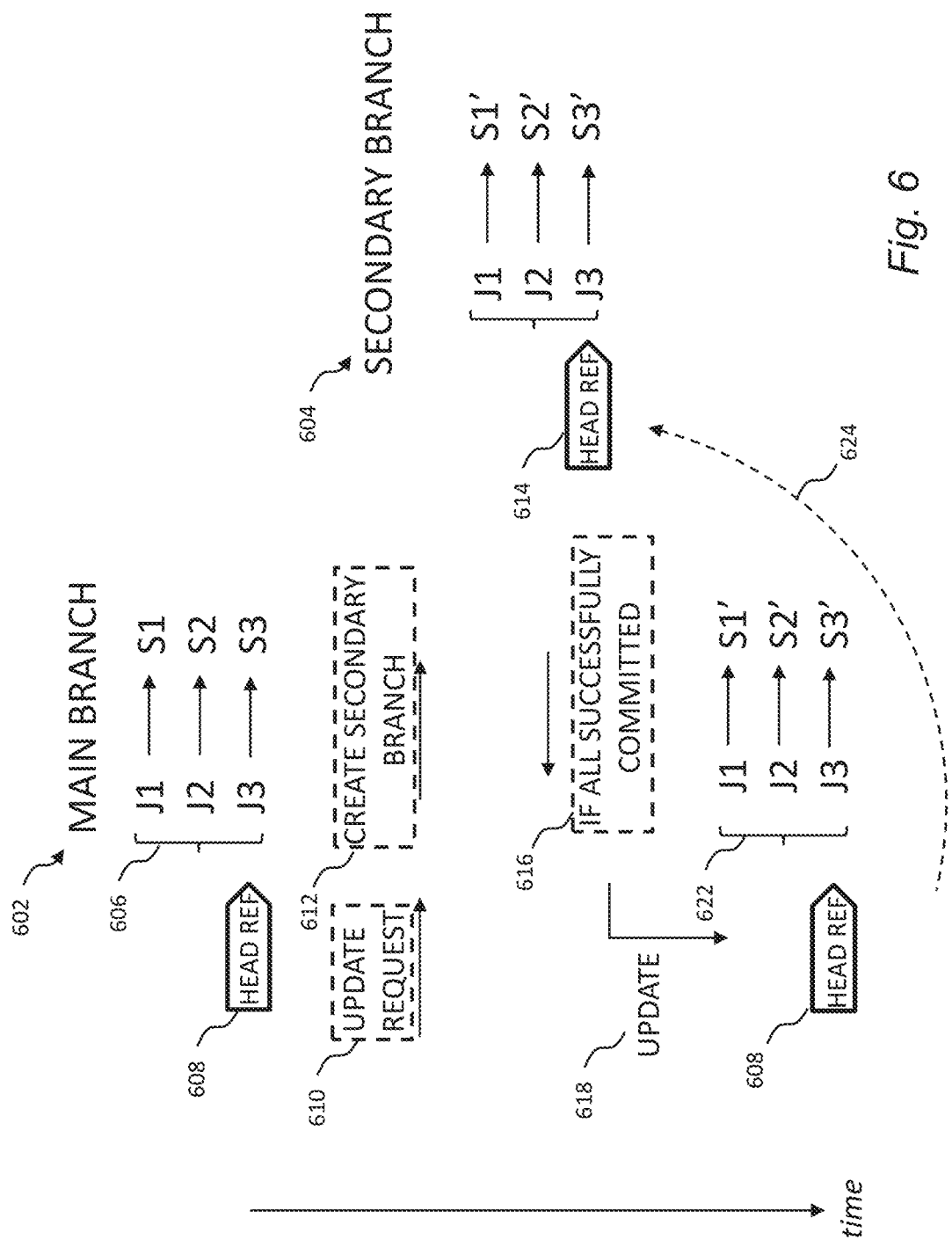
FIG. 6 is a schematic view of how different branches may be used to perform synchronised updates according to one or more example embodiments.

FIG. 6 is a schematic diagram of visualizing how a main and a second branch 602, 604 may be generated, for example by the second entity 304 shown in FIG. 3, and used for synchronizing dataset updates atomically for according to example embodiments.

For example, the main branch 602 may be associated with first to third code sets, or tasks, J1-J3, which collectively comprise a first build 606. It may be assumed that each code set J1-J3, when successfully executed, produces respective datasets, e.g. tables, that are stored as files in respective memory locations S1-S3. In accordance with known code versioning platforms, such as GitHub mentioned earlier, a head reference "Head Ref" 608 keeps track of the last committed transaction which results from successful execution of the code sets J1-J3.

Responsive to an update request 610 from the third entity 306 shown in FIG. 3 (or an internal update trigger) the secondary branch 604 may be generated based on the first branch 602. The secondary branch 604 may therefore comprise a new processing branch which takes the same first to third code sets J1-J3, which may be stored as new versions of the original first to third code sets, and executes them. This may comprise duplicating the first to third code sets or re-running the first to third code sets of the main branch 602 and associating their outputs with the secondary branch 604 rather than the main branch.

Assuming all successfully complete, updated datasets are generated and stored as files in respective memory locations S1', S2', S3'. A second head reference "Head Ref" 614 keeps track of the last committed transaction(s) which results from successful execution of the code sets J1-J3 in the secondary branch 604.

Assuming, as above, all of the first to third code sets J1-J3 successfully execute (commit), as determined in an operation 616, then an update operation may be performed in an operation 618. This update operation 618 may comprise updating the first head reference 608 so that it now points, as indicated by reference numeral 622, to the respective memory locations S1', S2', S3' which comprise the updated datasets for the first build 606. Alternatively, the update operation 618 may comprise updating the first head reference 608 so that it now points, as indicated by reference numeral 624, to the memory locations associated with the second head reference 614.

One or more downstream processes may be linked to the first head reference 608 so that the updated datasets in respective memory locations S1', S2', S3' can be received from these locations.

The process may repeat on this basis at subsequent update times.

Assuming, for example, that the process repeats from operation 612, if one or more of the first to third code sets J1-J3 do not successfully execute, then operation 616 would fail and hence no update operation 618 would occur. The first head reference 608 would not update and consequently would still point to the previous set of datasets (which all successfully updated.) The secondary branch 604 could be deleted at this point.

Figure 7:
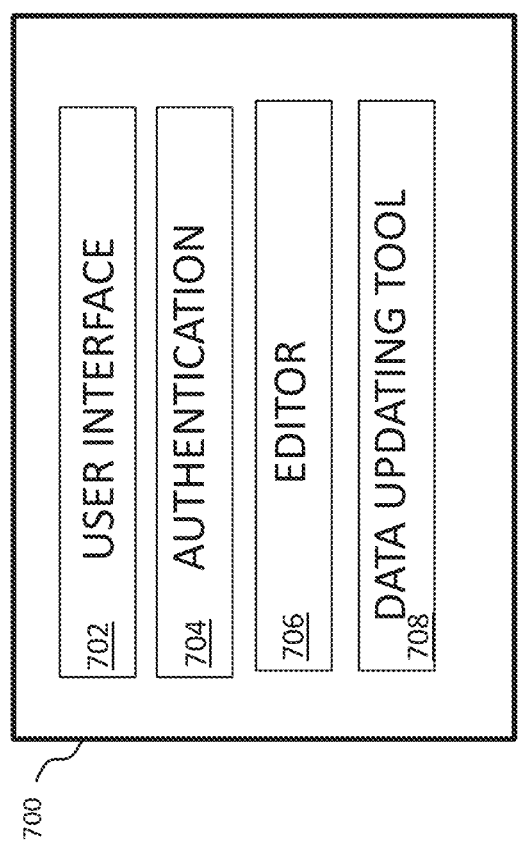
FIG. 7 is a block diagram of an apparatus that may be configured to perform the FIG. 5 operations.

FIG. 7 is a block diagram indicating functional elements of an apparatus 700 according to example embodiments, for example the second entity 304 of FIG. 3.

The apparatus 700 may comprise a user interface 702, an authentication module 704, an editor 706 and a data updating tool or module 708 configured to perform operations mentioned above with reference to FIG. 5, for example.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A computer-implemented method, wherein the method is performed using one or more processors, the method comprising:
    providing a first code branch associated with a plurality of code sets which, when executed, produce respective first time-series datasets, stored in a first memory location, for provision to a downstream process linked to the first code branch;
    providing an update to a downstream process that the first time-series datasets are stored in the first memory location via a first pointer to the first memory location;
    generating a second code branch, based on the first code branch, the second code branch executing the plurality of code sets and, if successfully committed, storing respective second time-series datasets, stored in a second memory location;
    determining if all code sets executed by the second code branch have successfully committed;
    responsive to a negative determination, regenerating the second code branch based on a different version of the second code branch in a recursive process until the second code branch is successfully generated; and
    responsive to a positive determination, providing an update to the downstream process.

2. The computer-implemented method of claim 1, wherein the method further comprises:
    responsive to a negative determination, deleting the second code branch.

3. The computer-implemented method of claim 1, wherein the method further comprises:
    detecting an updating event associated with the first code branch; and
    generating the second code branch and executing the plurality of code sets responsive to detection of the updating event.

4. The computer-implemented method of claim 1, wherein the update to the downstream process indicates that the second time-series datasets are stored in the second memory location via a second pointer to the second memory location.

5. The computer-implemented method of claim 1, wherein generating the second code branch comprises replicating the plurality of code sets associated with the first code branch and executing the replicated plurality of code sets as part of the updating process independently of the plurality of code sets associated with the first code branch.

6. The computer-implemented method of claim 1, wherein the first code branch is associated with respective memory locations which, by means of the updated one or more pointers, point to the respective memory locations associated with the second code branch.

7. The computer-implemented method of claim 1, wherein the plurality of code sets comprise code which, when executed, receives or causes receipt of, in one time-series dataset, data representing component failure reports and, in another time-series dataset, data representing at least a set of entities and constituent components of the entities, the downstream process being configured to identify entities having constituent components that require updating or servicing based on the component failure reports.

8. A computing system comprising:
one or more processors; and
memory storing instructions that, when executed by the one or more processors, cause the computing system to perform:
providing a first code branch associated with a plurality of code sets which, when executed, produce respective first time-series datasets, stored in a first memory location, for provision to a downstream process linked to the first code branch;
providing an update to a downstream process that the first time-series datasets are stored in the first memory location via a first pointer to the first memory location;
generating a second code branch, based on the first code branch, the second code branch executing the plurality of code sets and, if successfully committed, storing respective second time-series datasets, stored in a second memory location;
determining if all code sets executed by the second code branch have successfully committed;
responsive to a negative determination, regenerating the second code branch based on a different version of the second code branch in a recursive process until the second code branch is successfully generated; and
responsive to a positive determination, providing an update to the downstream process.

9. The computing system of claim 8, wherein the instructions further cause the computing system to perform:
responsive to a negative determination, deleting the second code branch.

10. The computing system of claim 8, wherein the instructions further cause the computing system to perform:
detecting an updating event associated with the first code branch; and
generating the second code branch and executing the plurality of code sets responsive to detection of the updating event.

11. The computing system of claim 8, wherein the update to the downstream process indicates that the second time-series datasets are stored in the second memory location via a second pointer to the second memory location.

12. The computing system of claim 8, wherein the generating of the second code branch comprises replicating the plurality of code sets associated with the first code branch and executing the replicated plurality of code sets as part of the updating process independently of the plurality of code sets associated with the first code branch.

13. The computing system of claim 8, wherein the first code branch is associated with respective memory locations which, by means of the updated one or more pointers, point to the respective memory locations associated with the second code branch.

14. The computing system of claim 8, wherein the plurality of code sets comprise code which, when executed, receives or causes receipt of, in one time-series dataset, data representing component failure reports and, in another time-series dataset, data representing at least a set of entities and constituent components of the entities, the downstream process being configured to identify entities having constituent components that require updating or servicing based on the component failure reports.

15. A computer program product comprising a non-transitory computer-readable medium readable by a processing circuit, the non-transitory computer-readable medium storing instructions executable by the processing circuit to cause a method to be performed, the method comprising:
providing a first code branch associated with a plurality of code sets which, when executed, produce respective first time-series datasets, stored in a first memory location, for provision to a downstream process linked to the first code branch;
providing an update to a downstream process that the first time-series datasets are stored in the first memory location via a first pointer to the first memory location;
generating a second code branch, based on the first code branch, the second code branch executing the plurality of code sets and, if successfully committed, storing respective second time-series datasets, stored in a second memory location;
determining if all code sets executed by the second code branch have successfully committed;
responsive to a negative determination, regenerating the second code branch based on a different version of the second code branch in a recursive process until the second code branch is successfully generated; and
responsive to a positive determination, providing an update to the downstream process.

16. The computer program product of claim 15, wherein the method comprises:
responsive to a negative determination, deleting the second code branch.

17. The computer program product of claim 15, wherein the method further comprises:
detecting an updating event associated with the first code branch; and
generating the second code branch and executing the plurality of code sets responsive to detection of the updating event.

18. The computer program product of claim 15, wherein the update to the downstream process indicates that the second time-series datasets are stored in the second memory location via a second pointer to the second memory location.

19. The computer program product of claim 15, wherein generating the second code branch comprises replicating the plurality of code sets associated with the first code branch and executing the replicated plurality of code sets as part of the updating process independently of the plurality of code sets associated with the first code branch.

20. The computer program product of claim 15, wherein the first code branch is associated with respective memory locations which, by means of the updated one or more pointers, point to the respective memory locations associated with the second code branch.

\* \* \* \* \*